US009734250B2

(12) United States Patent
Kelsey et al.

(10) Patent No.: US 9,734,250 B2
(45) Date of Patent: Aug. 15, 2017

(54) DIGITAL ASSET MANAGEMENT FOR ENTERPRISES

(71) Applicant: David Kelsey, Wayzata, MN (US)

(72) Inventors: David Kelsey, Wayzata, MN (US); John Paul Behr, Minnetonka, MN (US)

(73) Assignee: David Kelsey, Wayzata, MN (US)

( * ) Notice: Subject to any disclaimer, the term of this patent is extended or adjusted under 35 U.S.C. 154(b) by 302 days.

(21) Appl. No.: 14/339,190

(22) Filed: Jul. 23, 2014

(65) Prior Publication Data

US 2016/0026717 A1 Jan. 28, 2016

(51) Int. Cl.
G06F 17/30 (2006.01)
H04L 29/08 (2006.01)
H04L 29/06 (2006.01)

(52) U.S. Cl.
CPC ...... *G06F 17/30867* (2013.01); *H04L 63/105* (2013.01); *H04L 67/1085* (2013.01); *H04L 67/30* (2013.01); *H04L 63/083* (2013.01)

(58) Field of Classification Search
CPC ............ G06F 17/30867; H04L 63/105; H04L 67/1085; H04L 67/30
See application file for complete search history.

(56) References Cited

U.S. PATENT DOCUMENTS

| | | | |
|---|---|---|---|
| 6,947,959 B1 | 9/2005 | Gill | |
| 6,976,028 B2 | 12/2005 | Fenton | |
| 7,921,116 B2 | 4/2011 | Finkelstein | |
| 8,065,303 B2 | 11/2011 | Probst | |
| 8,341,195 B1 | 12/2012 | Cole | |
| 8,515,902 B2 | 8/2013 | Savage | |
| 8,583,619 B2 | 11/2013 | Ghods | |
| 8,655,885 B1 | 2/2014 | Scott | |
| 8,706,778 B2 | 4/2014 | Penikis | |
| 8,935,204 B2 | 1/2015 | Peto | |
| 2004/0122690 A1* | 6/2004 | Willoughby | G06Q 10/08 705/337 |
| 2007/0073776 A1 | 3/2007 | Kalalian | |
| 2008/0109482 A1 | 5/2008 | Macchletti | |
| 2008/0168134 A1 | 7/2008 | Goodman | |
| 2008/0263103 A1 | 10/2008 | McGregor | |
| 2008/0263471 A1 | 10/2008 | Hooper | |
| 2009/0106234 A1 | 4/2009 | Siedlecki | |
| 2009/0125986 A1* | 5/2009 | Kiester | G06F 21/31 726/4 |
| 2009/0217352 A1 | 8/2009 | Shen | |
| 2010/0050080 A1 | 2/2010 | Libert | |
| 2010/0077048 A1* | 3/2010 | Czyzewicz | H04L 63/102 709/206 |
| 2010/0131547 A1 | 5/2010 | Magrath | |

(Continued)

Primary Examiner — Huawen A Peng
(74) Attorney, Agent, or Firm — Fredrikson & Byron, P.A.

(57) ABSTRACT

Systems and method for managing digital assets for a plurality of enterprises. The system may include enterprise profiles for each of the enterprises. Each enterprise profile can include one or more cost centers representative of divisions of the enterprise. Assets can be organized within cost centers within containers and folders. The arrangement of containers and folders can be representative of an organization structure of a division of the enterprise. Access to assets within the cost center can be determined by an access control module and be based on user-level and container-level permissions.

25 Claims, 15 Drawing Sheets

(56) References Cited

U.S. PATENT DOCUMENTS

| | | |
|---|---|---|
| 2011/0191320 A1 | 8/2011 | Glover |
| 2013/0166587 A1 | 6/2013 | Berry |
| 2013/0232149 A1 | 9/2013 | Smith |
| 2013/0297614 A1 | 11/2013 | Leinberg |
| 2014/0040262 A1 | 2/2014 | Sven Winter |
| 2014/0068737 A1 | 3/2014 | Micucci |

* cited by examiner

FIG. 4B
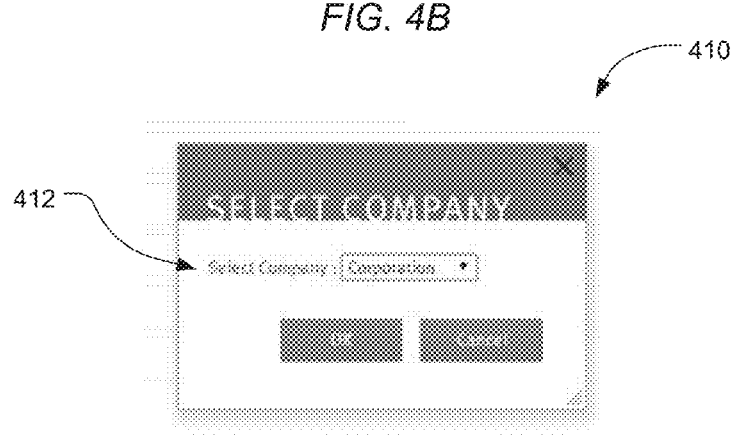
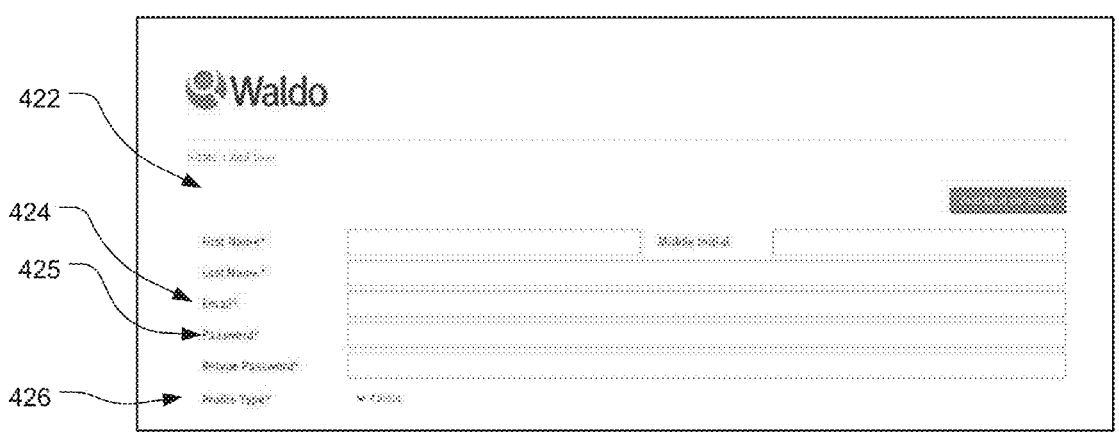
FIG. 4C

DIGITAL ASSET MANAGEMENT FOR ENTERPRISES

BACKGROUND

Conventional asset management systems are commonly used to manage digital assets. Digital assets can include, for example, video, sound, image, and document files and can vary in form and type. Digital asset management systems can be used to store, track, and organize digital assets and are often used to manage digital assets across an enterprise. There exists a need for robust asset management systems that can be tailored to meet the needs of enterprises.

SUMMARY

This disclosure generally relates to systems and methods for managing digital assets. In particular, certain examples relate to the managing of digital assets for a plurality of enterprises. In some examples, an asset management system can include a plurality of enterprise profiles each associated with a distinct enterprise. Certain examples of the asset management system include an enterprise customization module adapted to customize and configure the enterprise profile to be representative of an organizational structure of the enterprise. For example, an enterprise profile can include one or more cost centers each representative of a distinct division of the enterprise. In some examples, each cost center can include a plurality of containers and folders arranged in a hierarchical structure that parallels an organizational structure of the enterprise. Certain examples of the asset management system include an access control module that provides access privileges to users based on user-level and container-level permissions. In some examples, an access control module can also control access based on an override option associated with the user-level and container-level permissions. Examples of the system can also include an upload module for ingesting digital assets, a search module for querying and presenting assets stored in the system, and a workspace module adapted to facilitate the continued development of digital assets.

Examples in this disclosure provide for one or more advantages over existing systems and methods for digital asset management. For example, certain embodiments provide for a system that effectively manages a plurality of enterprises. Features of the system provide asset management services that are highly customizable and configurable to meet the diverse requirements of different enterprises. For example, disclosed systems and methods include the use of cost centers, containers, and folders that can be easily arranged and configured to mirror the organizational structure of an enterprise. This feature provides for comfort and familiarity for individuals familiar with the organizational structure (e.g., employees of the enterprise) while using the asset management system. Further, certain disclosed features of the system are directed to maintaining the arrangement of the containers and folders to preserve the enterprise's organizational structure within the asset management system. Other features of the system, for example features embodied in an access control module, are directed to providing a highly customizable workspace that allows enterprises increased functionality and convenience in managing its assets over existing solutions.

BRIEF DESCRIPTION OF THE DRAWINGS

The following drawings are illustrative of particular embodiments of the invention and therefore do not limit the scope of the invention. The drawings are not necessarily to scale, unless so stated. The drawings are intended for use in conjunction with the explanations in the following detailed description. Embodiments of the invention will hereinafter be described in conjunction with the appended drawings, wherein like numerals denote like elements.

FIGS. 4B-E illustrate examples of user interfaces of an enterprise customization module for creating a user in an enterprise profile.

DETAILED DESCRIPTION

The following detailed description is exemplary in nature and is not intended to limit the scope, applicability, or configuration of the invention in any way. Rather, the following description provides some practical illustrations for implementing exemplary embodiments of the present invention. Examples of constructions, materials, dimensions, and manufacturing processes are provided for selected elements, and all other elements employ that which is known to those of ordinary skill in the field of the invention. Those skilled in the art will recognize that many of the noted examples have a variety of suitable alternatives.

Figure 1:
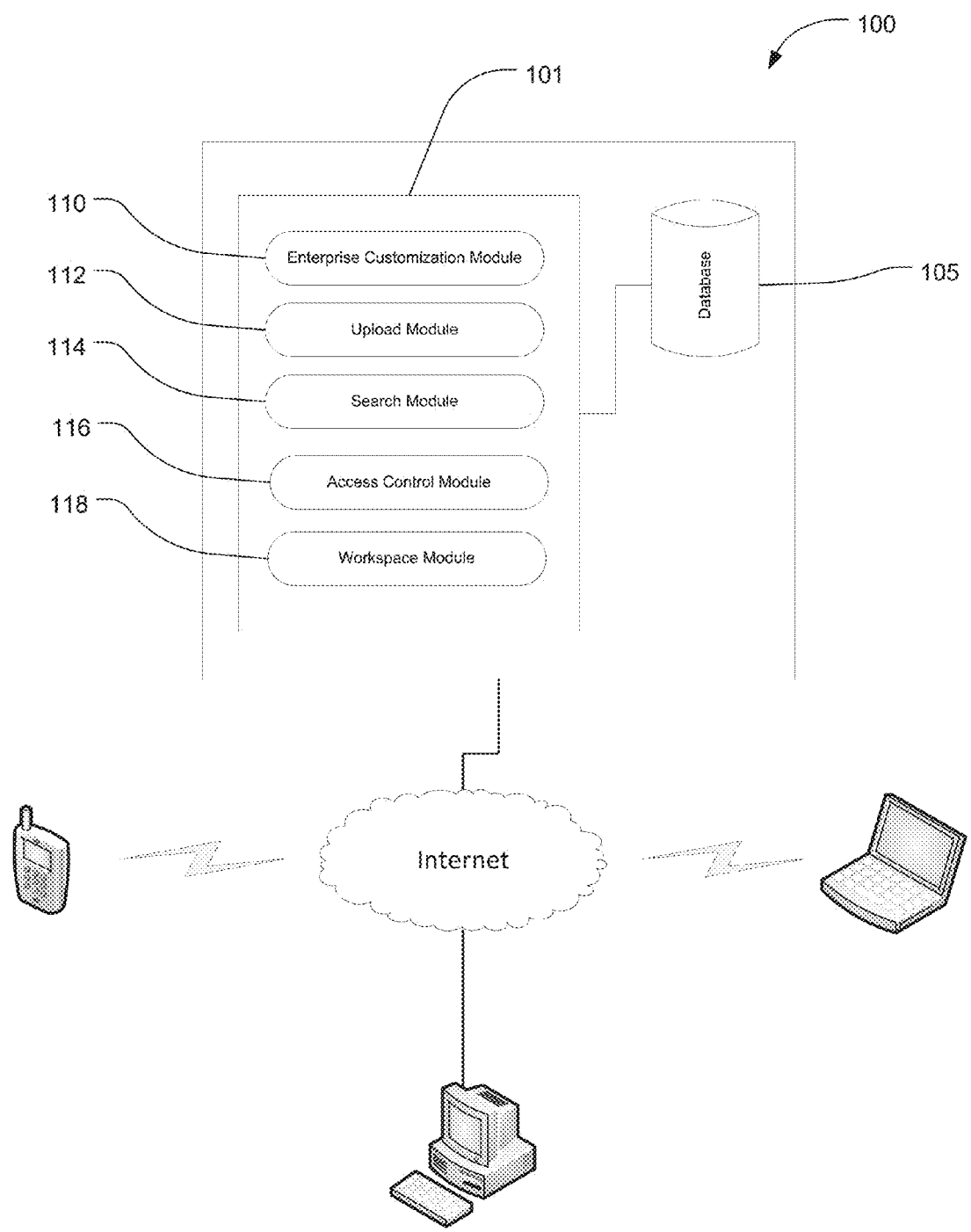
FIG. 1 illustrates an asset management system for managing a plurality of enterprises.

FIG. 1 illustrates an asset management system 100 for managing a plurality of enterprises. System 100 can include a computer storage medium 101 and database 105. Database 105 can be adapted to store digital assets. In some examples, system 100 may include one or more databases. Computer storage medium 101 can include one or more programming modules adapted to execute on a processor. In some examples, computer storage medium 101 can comprise an enterprise customization module 110, upload module 112, search module 114, access control module 116, and workspace module 118. The enterprise customization module can provide a number of features directed to the managing of assets for a plurality of enterprises. The upload module 112 can be configured to facilitate ingesting of digital assets into system 100 and storing the assets in database 105. The search module 114 can be configured to facilitate the querying of digital assets from database 105. The access control module 116 can be configured to control access to the digital assets. The workspace module 118 can be adapted to facilitate development of assets stored within system 100. Each of these modules will be discussed in further detail below. In some examples, asset management system 100 can be hosted on a server (not shown) and be accessible via a webpage or portal. Accordingly, system 100 can be accessed by any computing device with internet connectivity via a browser. In some examples, system 100 can be installed on-premises at an enterprise's facilities. In such examples, asset management services provided by system 100 can be made available through the enterprise's intranet, network, and/or extranet.

Figure 2:
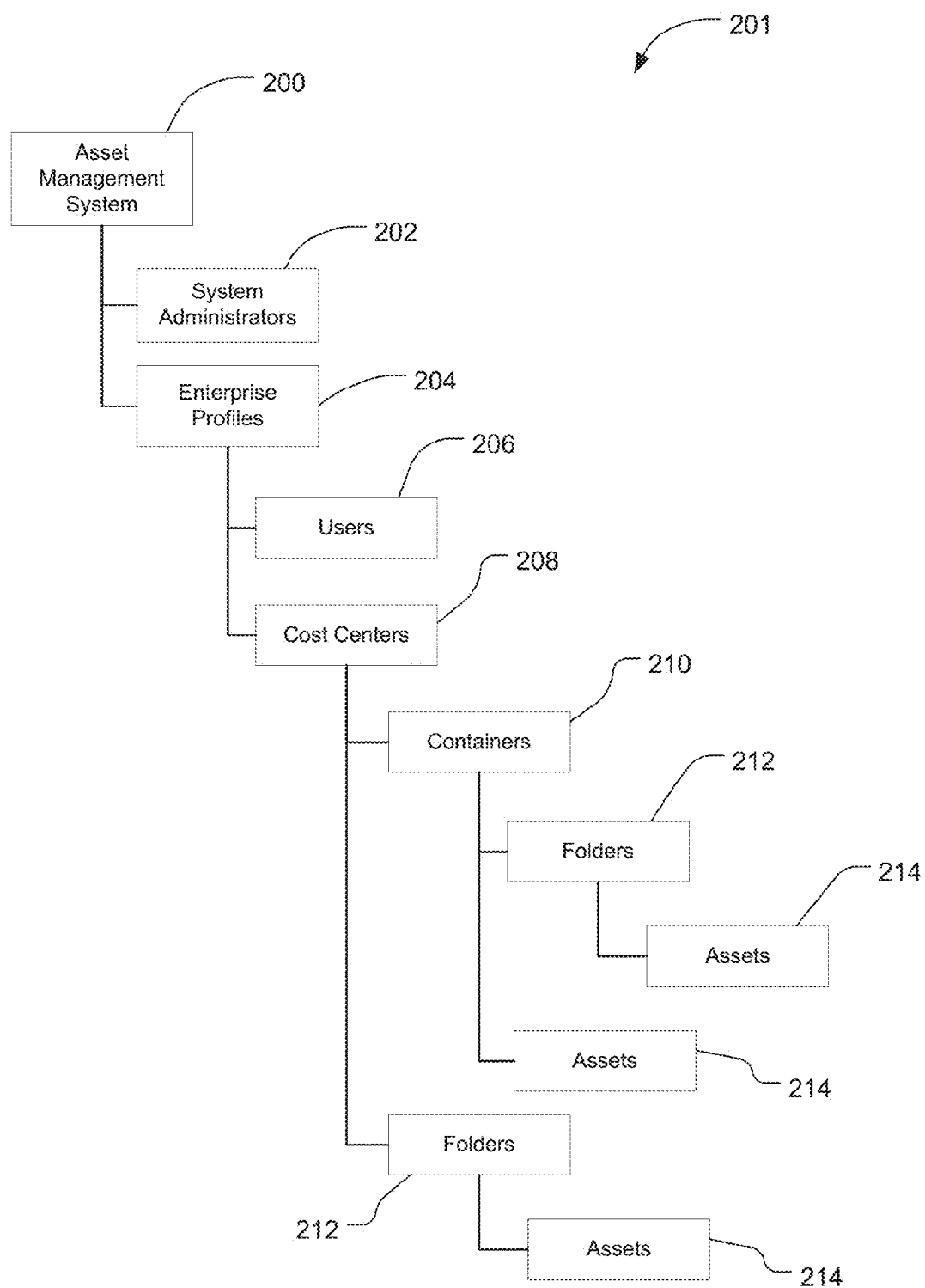
FIG. 2 is a diagram showing an example of a system hierarchy of an asset management system.

FIG. 2 is a diagram showing an example of a system hierarchy 201 of an asset management system 200 for enterprises. In this example, system 200 can be accessed by system administrators 202 and users 206. System 200 can include enterprise profiles 204, cost centers 208, containers 210, folders 212, and assets 214. System hierarchy 201 is illustrative of a hierarchical relationship between these elements of system 200. For example, system 200 can include a plurality of enterprise profiles 204 where each enterprise profile includes a plurality of users 206 and a plurality of cost centers 208. Each cost center 208 can include a plurality of containers 210 and a plurality of folders 212. Containers 210 can include folders 212 and digital assets 214, and folders 212 can include only digital assets 214. Containers 210 can also include other containers, and folders 212 can also include other folders. In some examples, the elements of system 200 can be generated and managed by an enterprise customization module. As will be discussed further below, this example of system hierarchy 201 provides for advantages that allow system 200 to effectively manage digital assets for a plurality of enterprises.

Figure 3:
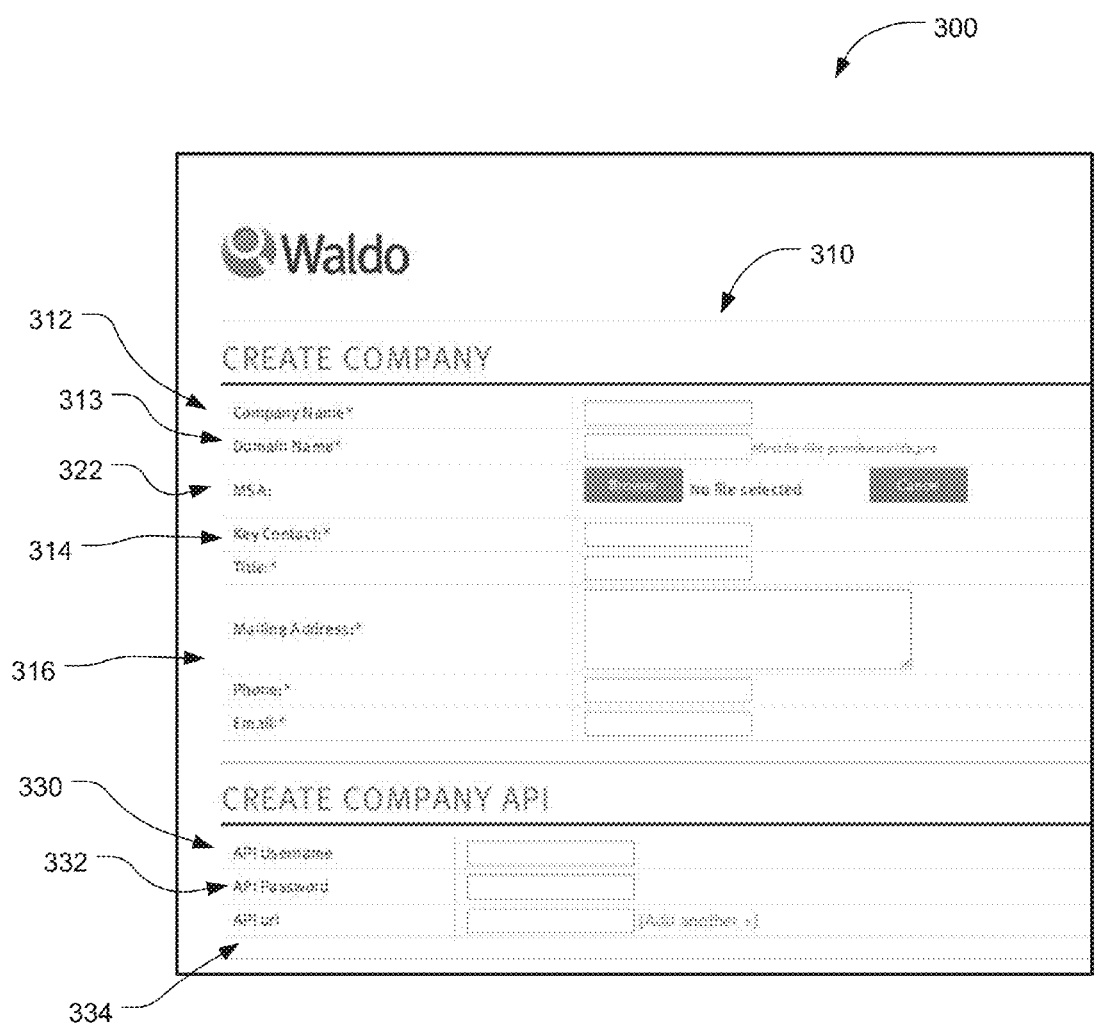
FIG. 3 illustrates an example of an interface of an enterprise customization module for creating an enterprise profile.

In some examples, system administrators 202 of system 200 can create enterprise profiles 204. FIG. 3 illustrates an example of a user interface 300 of an enterprise customization module. In some examples, a system administrator can use user interface 300 to create an enterprise profile. User interface 300 can be configured to receive enterprise information 310 which can include, for example, enterprise 312, enterprise domain name 313, enterprise contact 314, and enterprise contact information 316.

In some examples, user interface 300 can be configured to receive and associate a master services agreement 322 with an enterprise profile. The master services agreement 322 can include terms and conditions detailing digital asset management services for enterprise 312. This feature of the enterprise customization module helps facilitate digital asset management for a plurality of enterprises, where each enterprise is likely to negotiate a unique set of terms and conditions, as compared to using a standard set of terms and conditions which is more suitable for an asset management system adapted for individuals.

In some examples, an enterprise customization module can include a company application programming interface (API) 330 to facilitate integration of an asset management system with an enterprise's existing systems and applications. For example, enterprise 312 can use an API 330 of an enterprise customization module to directly access asset management services. As just one example, enterprise 312 can use the API 330 to facilitate a mass upload of assets to the asset management system. In some examples, enterprise 312 can develop and design its own user interfaces for use with services provided by the asset management system. This feature can be particularly advantageous for enterprises that prioritize its branding. For example, enterprise 312 may want to integrate services of an asset management system into an internal or external website instead of providing a link from the enterp2se's website to a portal of the asset management system. In such examples, enterprise 318 can design its own webpages which incorporate its corporate brand and design, then integrate the developed pages with the services of the asset management system using API 330. In such examples, a user navigating the enterprise's website can be provided a seamless and uninterrupted experience as they are provided asset management services without ever leaving the enterprise's domain.

In some examples, an enterprise customization module can also be configured to generate an API key for each enterprise profile to control access to services of the asset management system. In such examples, the enterprise customization module can receive via user interface 300 an API password 332 and one or more API uniform resource locators (URLs) 334. In some examples, the one or more API URLs can be a domain name associated with enterprise 312. The enterprise customization module can then generate an API key based on the API password 332 and the one or more API URLs 334. In some examples, the API key can be used to authenticate access via an API to services provided by the asset management system. In some examples, an enterprise customization module will only authenticate connections originating from an API URL 334. These features provide the advantage of enhanced security by preventing unauthorized access to assets stored in an enterprise profile. These features can also prevent an enterprise's accidental or incidental access to assets stored in another entity's enterprise profile.

Referring back to FIG. 2, enterprise profiles 204 can include a plurality of users 206. In some examples, users 206 will only have access to settings and digital assets of the enterprise profile 204 in which it is associated. Accordingly, users 206 typically will not have access to settings and digital assets of any other enterprise profiles. This hierarchical relationship between enterprise profiles 204 and users 206 allows system 200 to effectively manage digital assets of a plurality of enterprises.

Figure 4A:
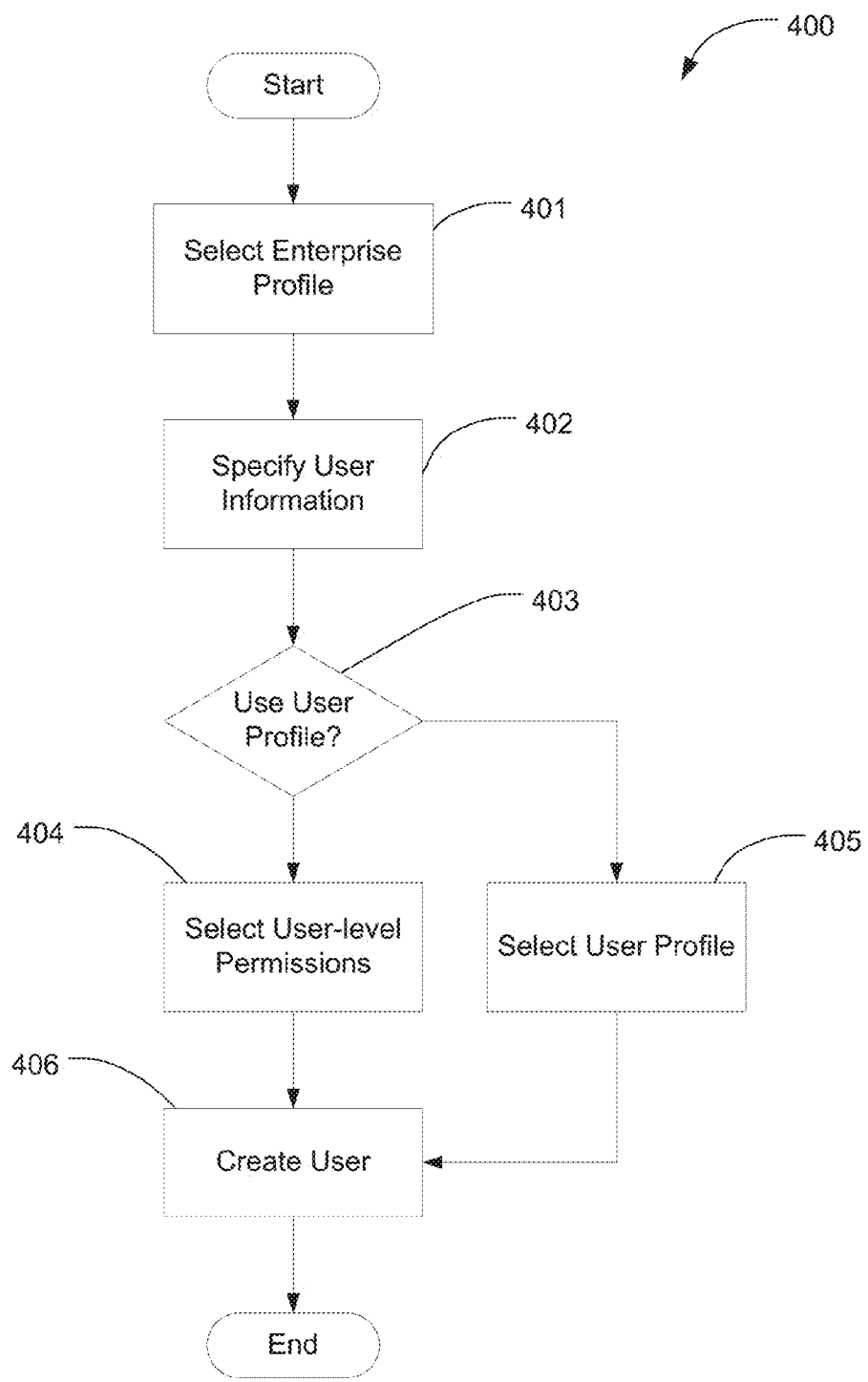
FIG. 4A is a flow diagram illustrating a method for creating a user in an enterprise profile.

FIG. 4A is a flow diagram illustrating a method 400 for a creating a user in an enterprise profile. In some examples, an enterprise customization module can be adapted to facilitate the steps of method 400 to allow an authorized user (e.g., a system administrator or a user with requisite permissions) to create a user. In some examples, method 400 includes selecting 401 an enterprise profile, specifying 402 user information, and determining 403 whether the user will be created based on a user profile. If a user profile will be used then a user profile can be selected 405, otherwise user-level permissions can be manually selected 404 by a user. Once user-level permissions have been defined, the user can be created 406. Each of these steps of method 400 are discussed below with reference to FIGS. 4B-E.

FIG. 4B illustrates a user interface 410 of an enterprise customization module for selecting an enterprise profile 412 in which to create a user. After selecting an enterprise profile, an authorized user can specify user information for the user. FIG. 4C illustrates a user interface 420 of an enterprise customization module for specifying user information. User information can include personal information 422, e-mail 424, and password 425. In some examples, e-mail 424 can serve as a username for purposes of logging into the asset management system. As will be discussed further below, in some examples, the authorized user can select a pre-existing user profile type 426 to define user-level permissions for the user. In this example, user profile "Admin," which defines user-level permissions consistent with a cost center administrator, is selected.

Figures 4D, 4E:
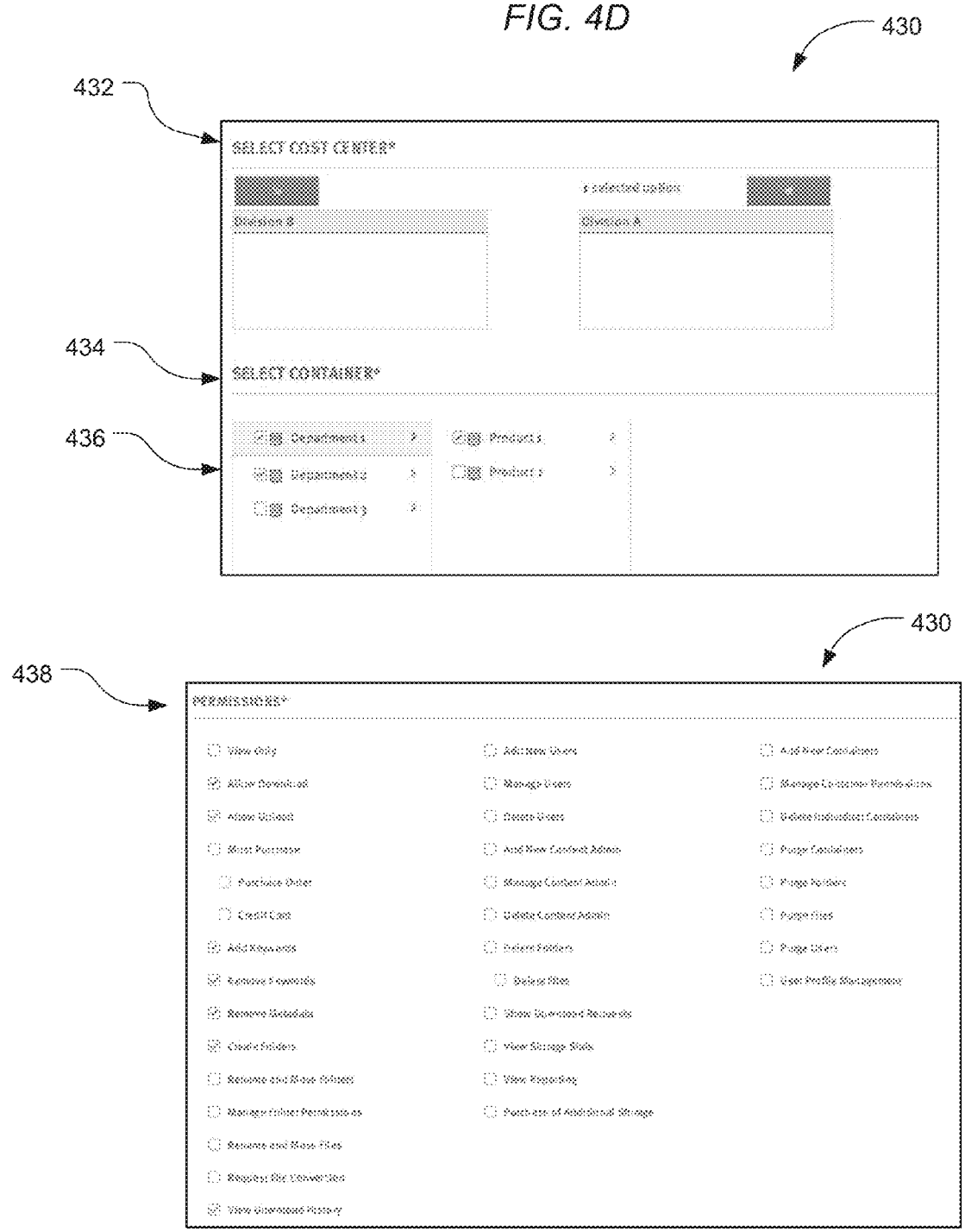

Once user information has been provided, the authorized user can define user-level permissions for the user. In some examples, user-level permissions can include a set of actions the user can or cannot perform. As will be discussed further below, in certain examples an asset management system can include an access control module adapted to control the user's access at least in part based on the user-level permissions. As noted above, user-level permissions can be defined by manually selecting permissible actions, or by using a pre-existing user profile that includes predefined permissions. FIGS. 4D and 4E illustrate a user interface 430 of an enterprise customization module for selecting user-level permissions. FIG. 4D shows user interface 430 adapted to receive a selection of cost centers 432 in which the user can access. In some examples, the user interface 430 can display all the cost centers included in an enterprise profile with which the user is associated (e.g., the enterprise profile selected in FIG. 4B). In this example, the authorized user has selected the cost center "Division A." Accordingly, the user will have access only to the cost center "Division A," and not to the cost center "Division B" as it was not selected by the authorized user. Similarly, user interface 430 can also be adapted to receive a selection of containers 434 in which the user can access. In some examples, the user interface 430 can display all the containers included in each of the selected cost centers 432. In some examples, the containers can be presented in a hierarchical structure 436 illustrative of a hierarchical relationship between the containers. In some examples, user interface 430 can also display folders included in the containers and receive a selection of folders to be made accessible to the user.

FIG. 4E shows user interface 430 presenting a set 438 of permissible actions. In creating a user, an authorized user can select from set 438 one or more of the permissible actions to define the user's user-level permissions. For example, selecting "Allow Download" will allow the user to download assets from the asset management system and selecting "Must Purchase," will require the user to pay before being able to download the asset.

Figure 4F:
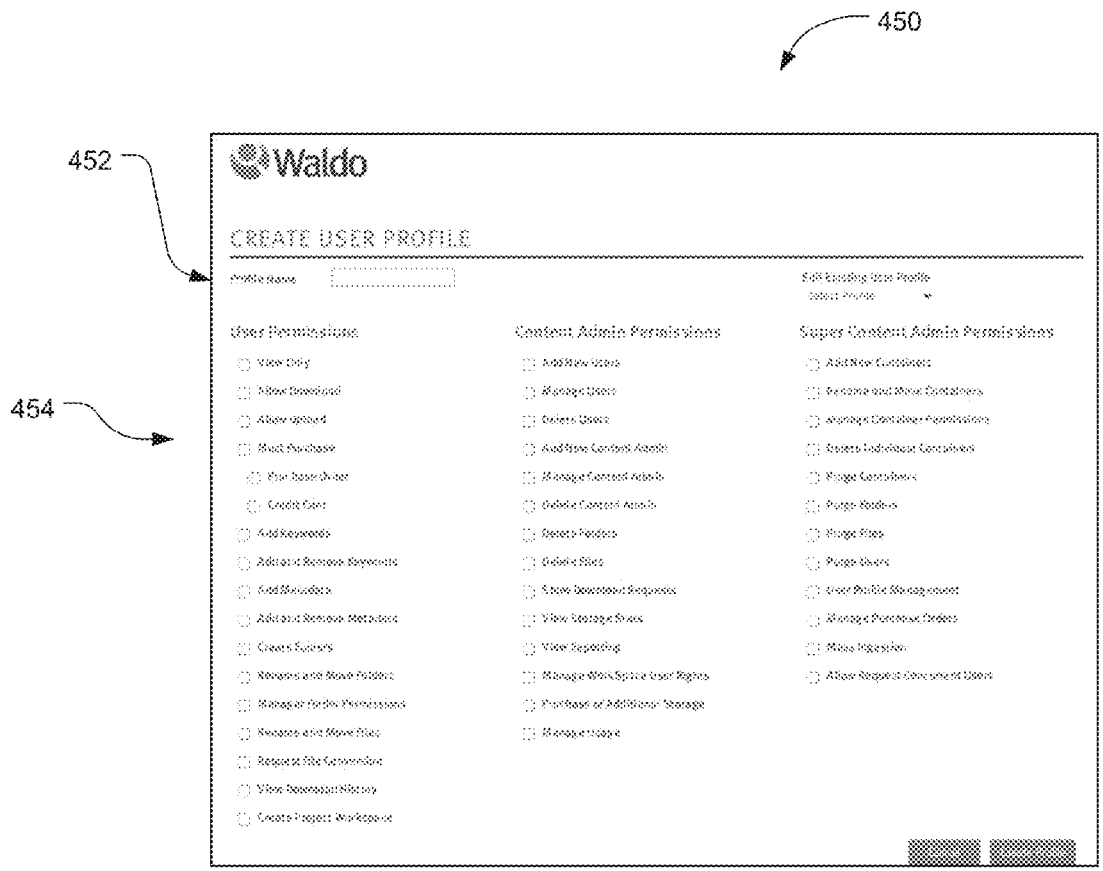
FIG. 4F illustrates an example of a user interface of an enterprise customization module for creating a user profile.

As noted above, in some examples, instead of manually selecting permissible actions from set 438, an authorized user can select a pre-existing user profile to streamline the user creation process (e.g., step 405 in method 400 of FIG. 4A). A user profile can comprise a set of predefined permissible actions. FIG. 4F shows a user interface 450 adapted to create a user profile 452. In this example, an authorized user can create a user profile by selecting one or more permissible actions from set 454 of permissible actions. After defining the user-level permissions for the user-profile, the user-profile can be saved for future use in the user-creation process. For example, as noted above with reference to FIG. 4C, a user profile type can be selected to define user-level permissions for a user. As noted above, the user-profile feature can streamline the user creation process, which can be particularly advantageous when an enterprise profile includes a large number of users. Another advantage of the user-profile feature is that it provides for a high degree of customization as it defines user-level permissions based on robust set of permissible actions. This high degree of customization allows enterprises to closely mirror privileges of a user in the asset management system after a real-world role of an individual associated with the enterprise. As a simple example, an enterprise profile can include the following user profiles: Vendor, Employee, Manager, and Administrator. In this example, the Vendor user profile can correspond with an individual having a commercial relationship with a business unit and can include user-level permissions allowing the vendor to only view and purchase digital assets. The Employee user profile can correspond with an employee of the business unit and can include user-level permissions allowing the employee to view and download assets without having to purchase the assets. The Manager user profile can correspond with a manager within the business unit and can include all the permissions granted to the Employee user profile and additional user-level permissions to create users and manage folders in an enterprise profile. Similarly, the Administrator user profile can correspond with a director or an IT administrator of a business unit and include all the permissions granted to the Manager user profile and additional user-level permissions to manage and edit the cost center (e.g., add, edit and delete containers). While this example includes four user profiles coinciding with four different roles within a business unit, it can be appreciated that any number of user profiles with varying user-level permissions can be created as necessary to coincide with roles within an enterprise. The high degree of customization in creating user profiles can be particularly advantageous for a system for managing assets for a plurality of enterprises, where each enterprise can have a unique set of roles.

In some examples, an enterprise customization module can be configured to automatically create users based on an enterprise's existing directory service. Enterprises typically employ a directory service application to manage access to its intranet, network, and/or extranet. Examples of directory services include Microsoft's Active Directory and Red Hat Directory Server. In some examples, an enterprise customization module can be configured to communicate with an enterprise's existing directory service application to automatically create corresponding users in an enterprise profile. In some examples, the enterprise customization module can be configured to communicate with the enterprise's directory service application using OAuth, SAML, or any other suitable authorization and authentication languages or standards. In some examples, in creating users within an enterprise profile, an enterprise customization module can create the users with user-level permissions according to information received from the enterprise's directory services application. As just one example, the enterprise customization module can determine a title or role of an employee of the enterprise and automatically create a user in the enterprise profile using a corresponding pre-existing user profile.

As noted above, in some examples an enterprise profile can include a plurality of cost centers. Cost centers can be representative of a division of an enterprise, for example a section or business unit. For example, an automobile manufacturer may have three distinct business units each directed to three different car models. It can be appreciated that while the three business units operate under a common enterprise, each business unit may have unique internal organizations and be monetarily isolated from one another. Cost centers can be used to emulate the organizational structure of the automobile manufacturer in an enterprise profile. For example, an authorized user (e.g., a system administrator or a user with the requisite privileges) can create an enterprise profile including a cost center for each of the three business units of the automobile manufacturer. While this example associates cost centers with defined business units of an enterprise, it should be appreciated that in other examples, cost centers can be used to represent any division of an enterprise as convenient for the enterprise to manage its digital assets. For example, in the example above, the automobile manufacturer may have a fourth cost center representative of a marketing department which markets all three products. This feature provides the advantage of allowing assets of an enterprise to be organized, managed, and even financed in a manner consistent with the way each business unit is operated.

Figure 5:
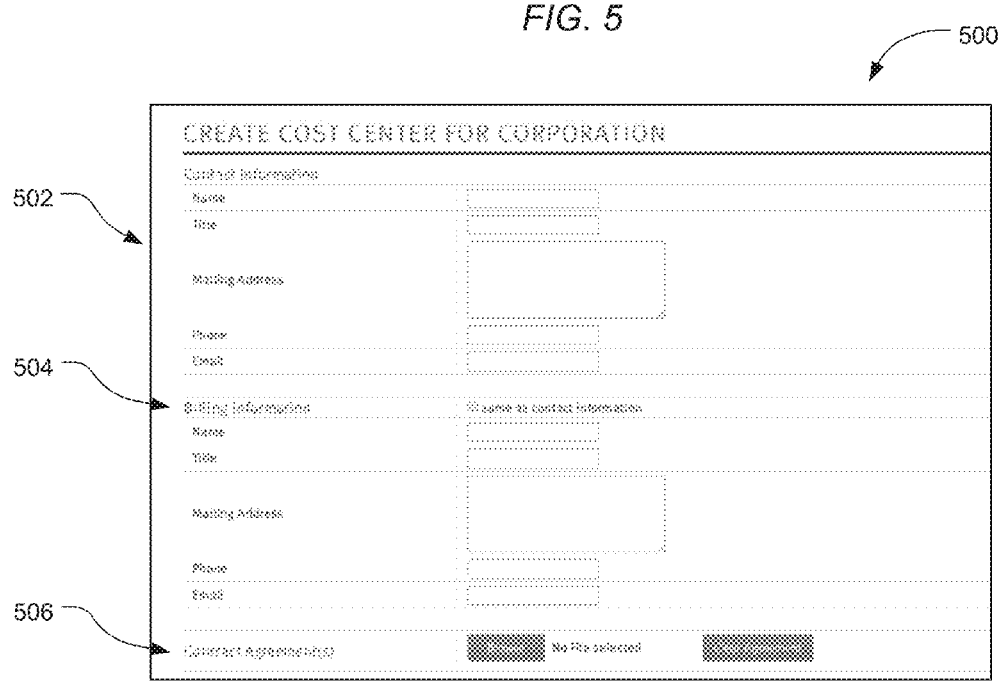
FIG. 5 illustrates an example of a user interface of an enterprise customization module for creating a cost center in an enterprise profile.

FIG. 5 illustrates a user interface 500 of an enterprise customization module for creating a cost center in an enterprise profile. User interface 500 can include the contact information 502 and billing information 504 associated with a cost center. In some examples, user interface 500 can also be configured to receive and associate a contract agreement 506 with a cost center. As noted above, cost centers can be representative of different business units of an enterprise. It can be appreciated that each of the business units may negotiate distinct contract agreements including unique terms and conditions detailing asset management services for each respective business unit. In some examples, contract agreement 506 can be associated with, and subject to the terms and conditions of, a master services agreement associated with an enterprise.

In some examples certain facets of digital asset management services can be defined at the cost center level, as compared to the enterprise profile level. Facets of digital asset management services can include, but is not limited to, defining the amount of storage to be allocated to the cost center, the price per unit of storage (e.g., dollars per terabyte), a number of concurrent users allowed to access the cost center, a bandwidth of the cost center (e.g., for uploading and downloading of assets), and administrative privileges and permissions that can be granted to users of the enterprise profile to which the cost center is associated. In some examples, an enterprise customization module can also be adapted to provide automatic notifications for each cost center. For example, the contact of a cost center can be automatically notified when the cost center approaches its storage capacity and provide the contact the option of purchasing more storage. This high degree of configurability and customization at the cost center level provides the distinct advantage of allowing different business units of an enterprise to operate autonomously under one enterprise profile. These features can be particularly advantageous for larger enterprises which require a both consistency and autonomy between its business units. The high degree of configurability and customization at the cost center level also makes the disclosed asset management system particularly useful solution for managing assets for a plurality of enterprises where the enterprises vary in size and organizational structures. It should be appreciated that while the example above describes defining different facets of digital asset management services at a cost center level, other examples of such facets can be defined at the enterprise profile level or a combination of the enterprise level and the cost center level.

In some examples, assets can be uploaded to a cost center then stored and organized in containers and folders. Referring back to FIG. 2, cost centers 208 can include a plurality of containers 210 and folders 212. In some examples, containers 210 are distinct from folders 212 in that containers can include other containers 210, folders 212, and/or digital assets 214, while folders can include only other folders 212 and/or digital assets 214. In such examples, folders 212 cannot include a container 210. In some examples, managing, organizing and/or viewing containers 210 can require a heightened level of privileges as compared to similar operations with respect to folders 212. Thus, in some examples, only users with appropriate privileges (e.g., an administrator or a manager) can change the organization and arrangement of containers in a cost center.

Figure 6:
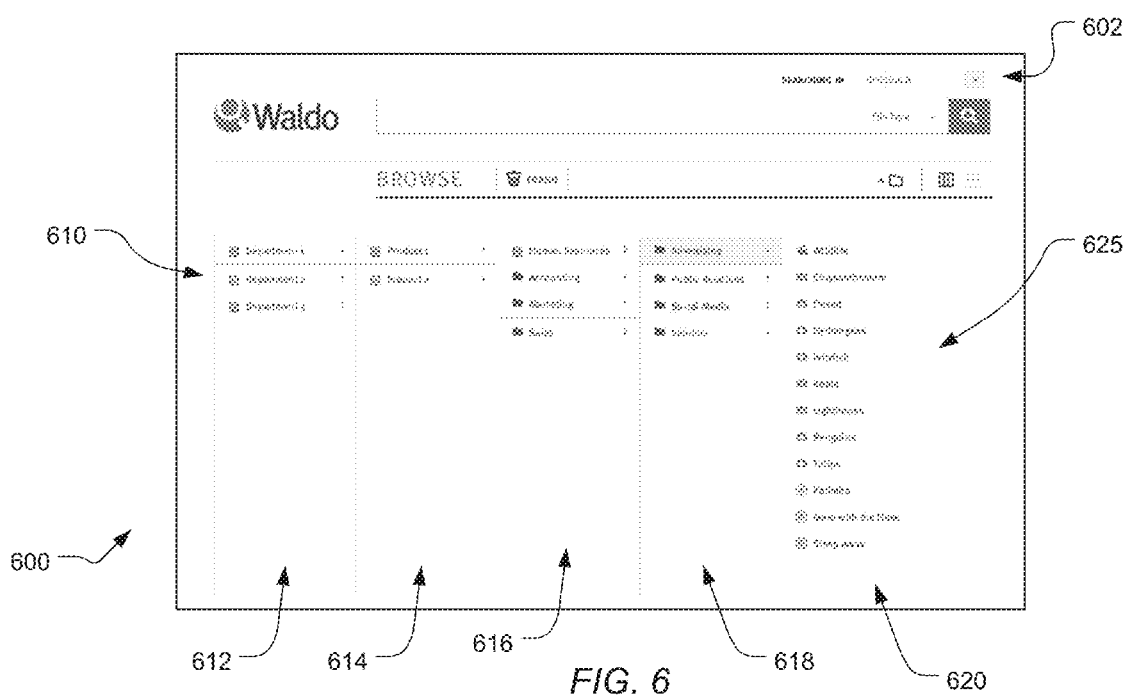
FIG. 6 illustrates a user interface presenting an arrangement of containers and folders according to an organizational structure of a business unit.

This hierarchical relationship between containers and folders allows enterprises to organize and manage assets within a cost center consistently with an organization and structure of business units of each enterprise. For example, containers of a cost center can be customized and arranged to be representative of an organizational structure of an enterprise's business unit. FIG. 6 illustrates a user interface 600 presenting containers and folders organized according to an organizational structure 610 of a business unit. In this example, cost center 602 is representative of a "Division A" of an enterprise. A first tier 612 of organizational structure 610 includes three containers each corresponding to a different department of Division A. A second tier 614 includes two containers each corresponding to different products managed by "Department 1." A third tier 616 includes various containers and folders associated with "Product 1," and a fourth tier 618 includes a number of folders relating to the marketing of Product 1. A fifth tier 620 presents a number of digital assets 625 stored within an "Advertising" folder. It can be appreciated that arranging the containers of cost center 602 in accordance with an organizational structure 610 of a business unit provides for an intuitive experience for users familiar with the organization structure of a business unit (e.g., employees working in Division A). Accordingly, digital assets can be organized in a manner that is familiar to users of the asset management system thereby allowing assets to be more readily found and accessible. Another advantage provided by the hierarchical relationship between containers and folders is that the heightened privileges required to manage containers as compared to folders can prevent deliberate or incidental modifications to the organization of containers. This helps to ensure that the organization of the cost center continues to mirror the organizational structure of the business unit.

Figure 7:
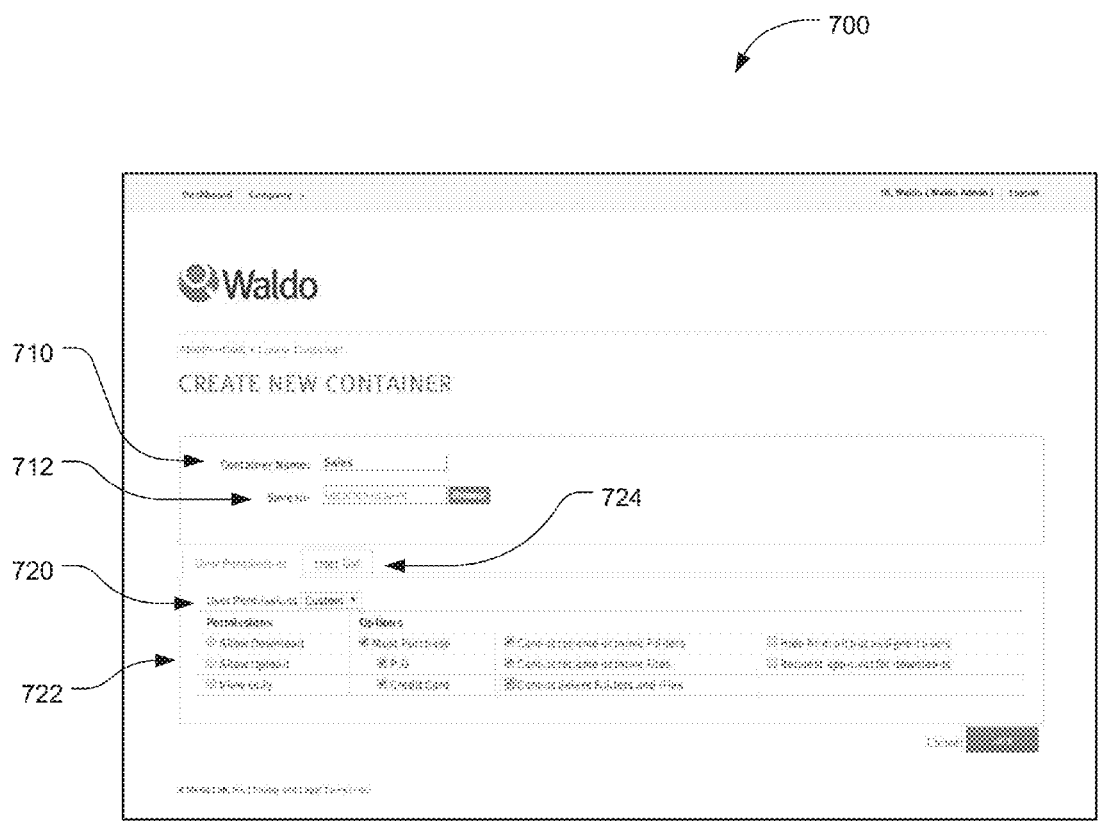
FIG. 7 illustrates a user interface of an enterprise customization module for creating a container within a cost center.

FIG. 7 illustrates a user interface 700 of an enterprise customization module for creating a container within a cost center. An authorized user creating the container can specify a container name 710 and a location 712 in which the container is to be created. In this example, the authorized user can manually enter in a location path or browse to a location. In some examples, the locations in which the authorized user can create a container may be limited to only the locations in which the authorized user has the requisite permissions to create a container.

In some examples, in creating a container within a cost center an authorized user may also define container-level permissions to access and/or manage the container. In this example, container-level permissions can be automatically set by selecting a pre-defined permission template 720 or by manually selecting permissible actions from a set of actions 722. In some examples, container-level permissions may also be defined on a user-by-user basis by providing one or more sets of users in user list 724. Permissions actions associated with a container may be provided or denied for particular users based on user list 724 and/or the selection of permissible actions from the set of actions 722.

In some examples, a system for managing digital assets for enterprises can include an access control module. In such examples, the access control module can be adapted to control a user's access to containers and folders according to both user-level permissions and container-level permissions.

As noted above with reference to FIG. 4E, user-level permissions can be defined during the creation of a user profile and can include a set of permissible actions that can be performed by the user. Similarly, as noted above with reference to FIG. 7, container-level permissions can be defined during the creation of a container and can include a set of permissible actions allowed to a user when accessing the container. In certain situations permissible actions defined by user-level permissions may conflict with permissible actions defined by container-level permissions. In such situations, an access control module can be adapted to resolve conflicting permissible actions as defined by user-level and container-level permissions.

In some examples, an access control module can be configured such that user-level permissions supersede container-level permissions. For example, a vendor may log into an asset management system using a user profile including user-level permissions that allow the vendor to view all containers, folders, and assets in a cost center but prohibits the vendor from downloading any assets without first purchasing the asset. In browsing through the cost center, the vendor encounters a container including container-level permissions that grants the downloading of all assets in the container without having to purchase the asset. In such an example, an access control module can prioritize the permissible actions defined by the vendor's user profile over the container-level permissions of the container. Accordingly, in this example, the vendor will still have to purchase the assets included in the container.

In some examples, an access control module can be configured such that container-level permissions supersede user-level permissions. For instance, in the example above where the vendor's user-level permissions conflict with the container's container-level permissions, when the vendor encounters the container the access control module can prioritize the permissible actions defined by the container-level permissions over the user-level permissions of the vendor's user profile. In this example, the vendor will not have to purchase the assets in the container.

In some examples, an access control module can be configured to prioritize the level of permissions that is more heightened. For example, if user-level permissions require that a user must purchase assets and the container-level permissions do not, an access control module can prioritize the user-level permissions. Conversely, if the container-level permissions require that users purchase assets and the user-level permissions do not, an access control module can prioritize the container-level permissions.

Figure 8:
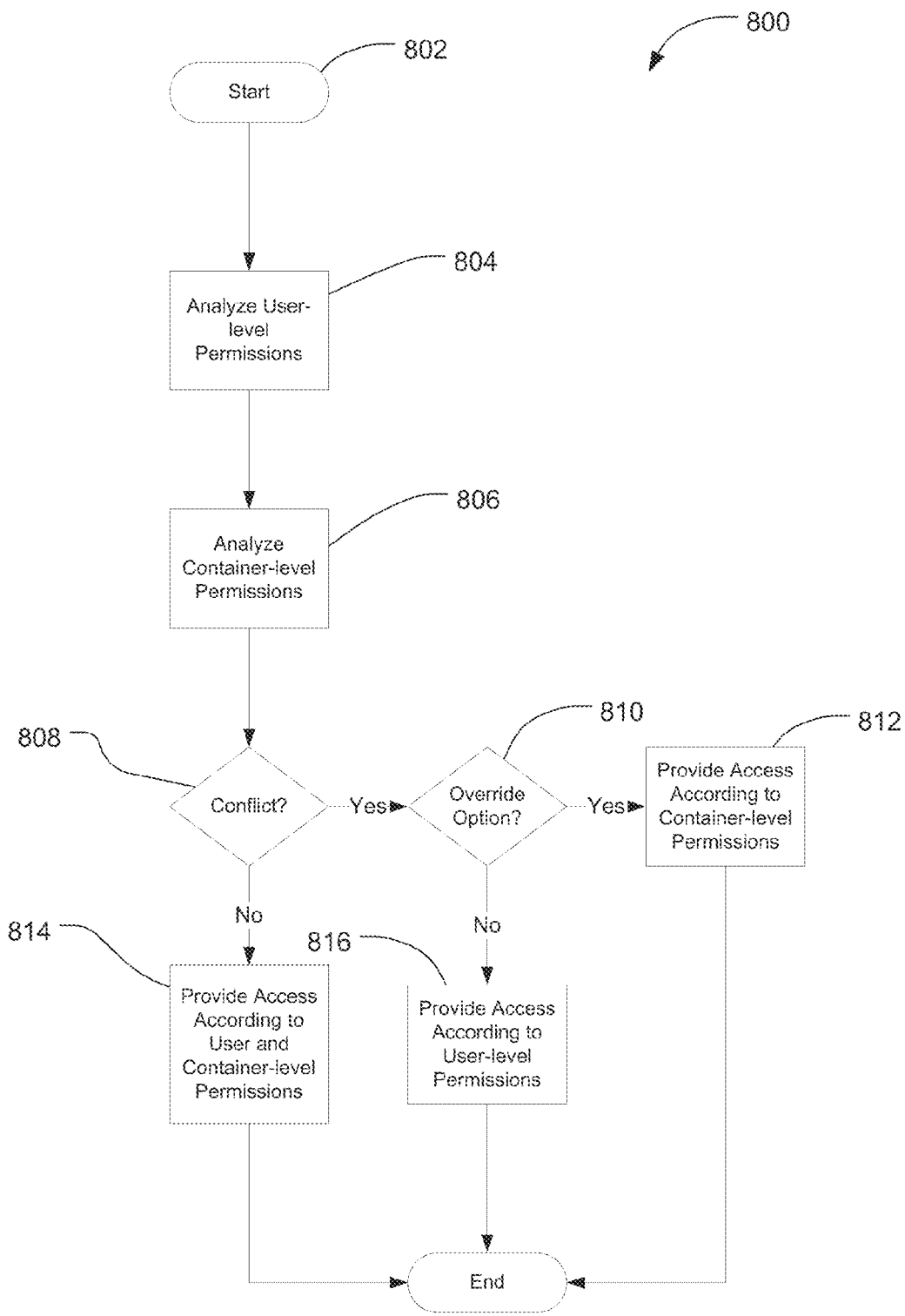
FIG. 8 is a flow diagram illustrating a method for providing access to a container.

In some examples, an access control module can be configured to selectively prioritize the container-level or the user-level permissions. FIG. 8 is a flow diagram illustrating a method 800 for providing access to a container. In some examples, an access control module can be adapted to perform the steps of method 800. The method begins at step 802 where a user accesses a container. An access control module can then analyze 804 the user-level permissions associated with the user's user profile and analyze the container-level permissions associated with the accessed container. The access control module will then determine if there is a conflict between the user-level and container-level permissions in step 808. If there is no conflict, then the access control module can provide 814 the user access and control over the container according to the user-level and container-level permissions. If the access control module determines in step 808 that there is a conflict between the user-level and container-level permissions, the access control module can then determine in step 810 whether an override option has been selected by a user. If the override option is selected, then the access control module prioritizes the container-level permissions and provides 812 access to the container accordingly. If the override option is not selected, then the access control module prioritizes the user-level permissions and provides 816 access to the container according to the user-level permissions. In some examples, the override option can be selectable in a user interface associated with the container. While the selection of the override option described in method 800 is associated with prioritizing container-level over user-level permissions, other examples are contemplated where selecting the override option prioritizes user-level over container-level permissions. In such examples, the override option can be selectable in a user interface associated with a user profile.

There are a number of advantages to controlling access on both a user-level and a container-level and providing for an override option, particularly as it applies to enterprises. For example, a container can be created with container-level permissions that do not require users to purchase assets stored in the container. When the container is accessed by a vendor with user-level permissions that require the purchasing of assets, the vendor will still have to purchase all the assets stored in the container as an access control module prioritizes the user-level permissions over the container-level permissions. In this example, if the override option is selected for the container, an access control module will prioritize the container-level permissions over the vendor's user-level permissions, thereby allowing the vendor to download assets from the container free of charge. Such a situation may arise where a business unit is running a promotion on the assets stored in the container for a limited period of time. In such a situation, the override option can be selected at the beginning of the promotional period, then turned off at the end of the promotional period. A similar situation can arise where a business unit wants to provide a free trial period for a vendor. In this situation, the vendor's user profile can be set to all downloads without purchasing and an override option can be selected for the vendor, thereby allowing the vendor to access and download assets from containers even when container-level permissions require assets to be purchased. It should be appreciated that there are many different situations where controlling access on both a user-level and container-level, and providing an override option at each level can provide an enterprise a high degree of control in managing its assets that can be used to meet various business goals.

In some examples, an access control module can control access based on folder-level permissions in addition to container-level and user-level permissions. In such examples, folder-level permissions are similar to container-level permissions. In some examples, folders can also include an override option to prioritize folder-level permissions.

Figure 9A:
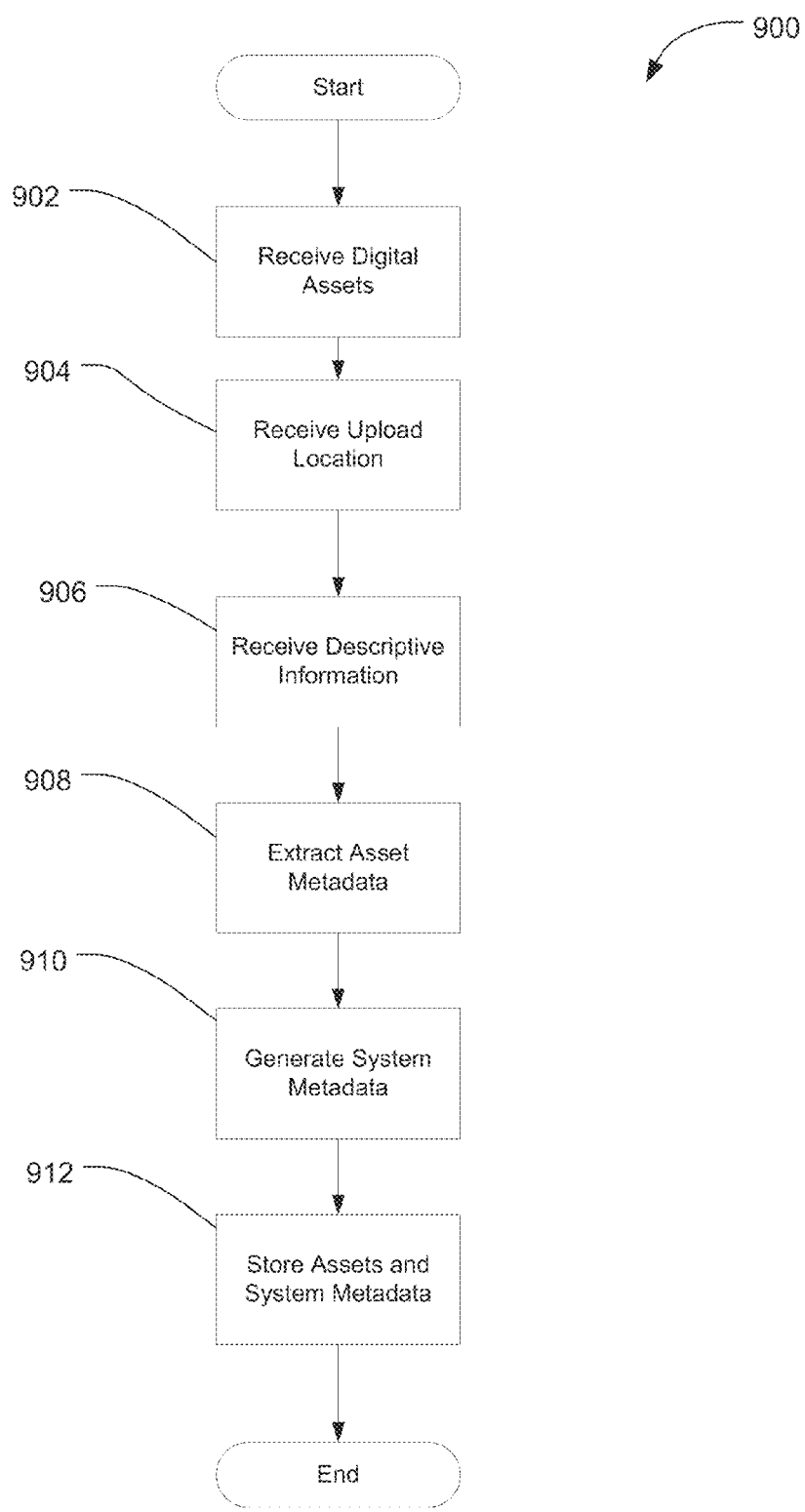
FIG. 9A is a flow diagram illustrating a method for uploading assets.

FIG. 9A is a flow diagram illustrating a method 900 for uploading assets in an asset management system. In some examples, an upload module can be adapted to facilitate the steps of method 900 to allow a user with the requisite permissions to upload assets into a cost center of an enterprise profile. In some examples, the upload module can be configured to receive 902 one or more digital assets, receive 904 an upload location, receive 906 descriptive information of the assets, extract 908 asset metadata from the digital assets, generate 910 system metadata, and store 912 the digital assets and the generated system metadata. Each of these steps of method 900 is discussed below with reference to FIGS. 9B and 9C.

Figure 9B:
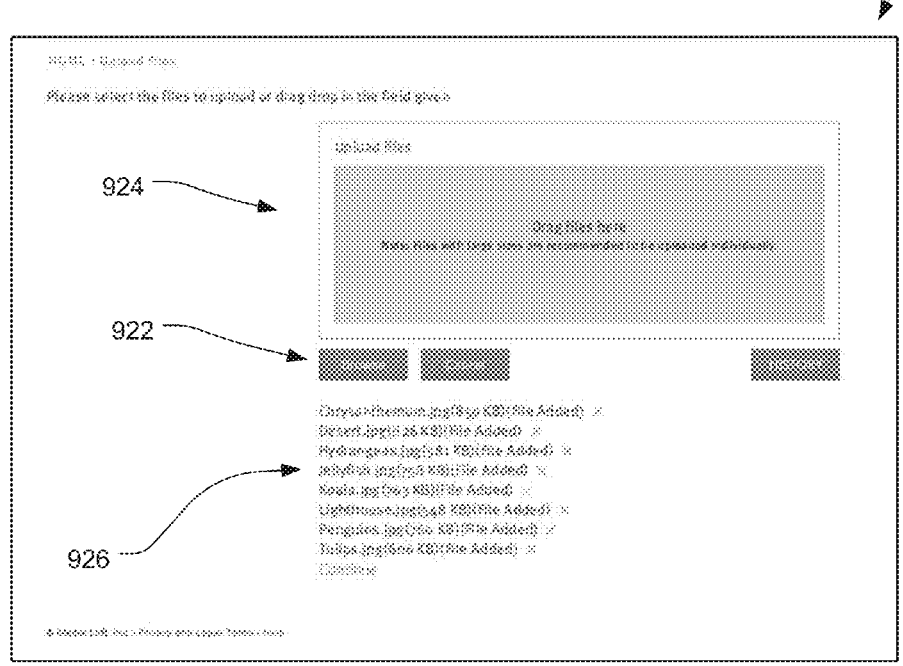
FIGS. 9B and 9C illustrate examples of user interfaces of an upload module.

FIG. 9B illustrates a user interface 920 of an upload module adapted to receive one or more digital assets from a user. In some examples, a user can select a browse button 922 to navigate to a local directory and select one or more digital assets to upload. User interface 920 can also include an asset upload area 924 wherein a user can drag and drop one or more assets to upload. In some examples, user interface 920 can present the received digital assets in upload list 926. This feature is particularly advantageous where a large number of assets are contemporaneously uploaded (e.g., batch uploading) as it allows the user to confirm that the digital assets selected by the user have been received by the upload module.

Figure 9C:
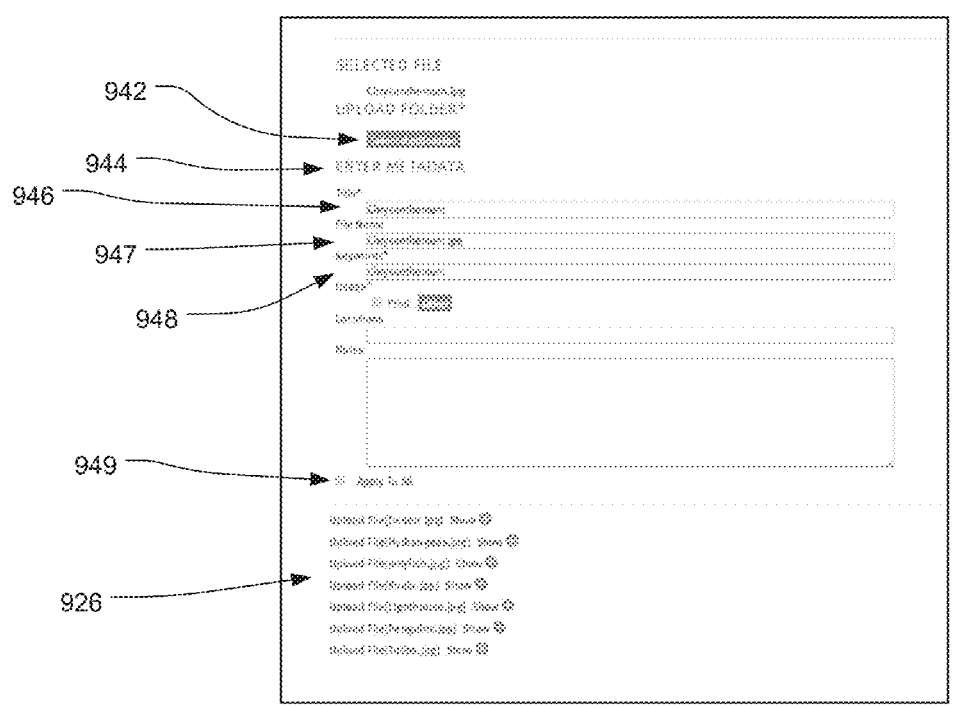

After receiving the digital assets, the upload module can then receive a location in a cost center in which to upload the files and receive descriptive information about the digital assets. For example, FIG. 9C illustrates a user interface 940 of an upload module adapted to receive a location and descriptive information. A user can select the Select destination button 942 to specify an upload folder within the cost center. In some examples, user interface 940 can include a form for receiving for descriptive information. For example, form 944 of user interface 940, titled "Enter Metadata," can be configured to receive descriptive information associated with one or more digital assets. Descriptive information can include, but is not limited to, the digital asset's title, file name, descriptive keywords, usage, locations associated with the digital asset (e.g., geolocation data), and descriptive notes.

As noted above, in some examples the upload module can be configured to automatically extract asset metadata from the one or more digital assets. In some examples, the extracted asset metadata can be used to facilitate and streamline the upload process. For example, in FIG. 9C, the upload module has extracted asset metadata from the digital asset "Chrysanthemum.jpg" and prepopulated fields 946, 947, and 948 of form 944 corresponding to the digital asset's title, file name, and descriptive keywords. In some examples, asset metadata can include, but is not limited to, file type, size, date modified, geolocation data, and author.

In some examples, an upload module can include features directed to facilitating and streamlining the process of contemporaneously uploading a plurality of digital assets. For example, user interface 940 can include an Apply to All checkbox 949. In this example, when checkbox 949 is selected the upload module will automatically apply descriptive information received in form 944 to all other digital assets to be uploaded. This feature is particularly useful in situations where there is a commonality between at least a subset of the assets to be uploaded. For example, the digital assets in list 926 may have been taken by a single photographer. Specifying the photographer's name, for example, in the "Keywords" or the "Notes" field and selecting the Apply to All checkbox 949 will copy the photographer's name into the descriptive information for all of the other assets to be uploaded. In some examples, the upload module can also be configured to permit a user to modify descriptive information of any of the digital assets to which the descriptive information was automatically copied. For example, where a photographer's name was automatically applied to all the digital assets to be uploaded, a user can select a digital asset from list 926 and delete or modify the automatically copied information.

After the upload module receives descriptive information and automatically extracts asset metadata, the upload module can then generate system metadata based on the descriptive information and the asset metadata. As will be discussed below, system metadata can be used by a search module to facilitate the querying and filtering of assets. Once the system metadata is generated, then the upload module can store the assets and the system metadata in the asset management system. In some examples, the system metadata is distinct from, but associated with, the digital assets. Accordingly, changes can be made to the system metadata without causing the associated digital asset to be modified in any way. This feature allows the digital asset to be stored and preserved in the original state in which it was uploaded while still allowing information about the asset to be updated and modified in the asset management system via the system metadata. For example, additional keywords or notes can be added to the system metadata associated with a digital asset to facilitate searching for the asset.

As noted above, an asset management system can include a search module for querying digital assets. For example, a search module can be adapted to present a user interface to a user for searching one or more databases of the asset management system, receive a search criteria from the user, generate a search query based on the search criteria, and generate search results based on the search query.

Figures 10A, 10B:
FIGS. 10A-D illustrate examples of user interfaces of a search module.

FIG. 10A illustrates a user interface 1000 of a search module adapted to locate and present digital assets to a user. In some examples, the search module can present user interface 1000 to receive a search description from the user. In some examples, user interface 1000 can include a search bar 1010 and search criteria 1012 and 1014. In this example, search criteria 1012 can comprise a dropdown list including all the cost centers in the enterprise profile with which the user is associated. In some examples, the search module will limit a search to only the selected cost center. In some examples, a search module can allow a user to select more than one cost center in which to perform a search. In this example, a user has selected the cost center "Division A." A user's search can be further refined using search criteria 1014 which comprises a dropdown list including different file types (e.g., image, document, audio, and video). Selecting a file type will limit a search to only the selected file type. In some examples, a search module can allow a user to select more than one file type. While this example provides for two types of search criteria, it should be appreciated that any number of search criteria can be presented to a user. Additional types of search criteria can include, but is not limited to file types, file date, upload date, location data, author, and usage. After specifying search criteria 1012 and 1014, a user can enter a search description into search bar 1010. Upon receiving the search description from the user, the search module can generate a search query based on the search description and search criteria, and generate search results by running the search query against the databases associated with the asset management system.

FIG. 10B illustrates a user interface 1020 of a search module adapted to present search results 1022 to a user. In some examples, the search module can be configured to generate a preview of each digital asset in the search results and present the previews to the user. For example, the search module can display a thumbnail of image file, or stream some or all of a audio or video file. In some examples, the search results can be presented to the user in a list format to facilitate faster browsing. In some examples the search results may be sorted according to a sort criteria, for example, a data modified or file type.

In some examples, a search module can be configured to generate search metadata based on the system metadata associated with the search results. In such examples, the search metadata can be used to create search filters 1030 that can be used to refine the search results 1022 to display a subset of the search result 1022. In some examples, the search metadata can comprise only the system metadata associated with each of the digital assets in the search result. For example, search filters 1030 include a filter 1032 to refine the search results according to an audio file type. In this example, filter 1032 only shows a single filter criteria "MP3" because the search results includes only audio files of the file type "MP3." In some examples, selecting the search filter 1032 will cause user interface 1020 to present to the user only audio files with the file type "MP3." In some examples, a user can select one or more filters from search filters 1030.

Figure 10C:
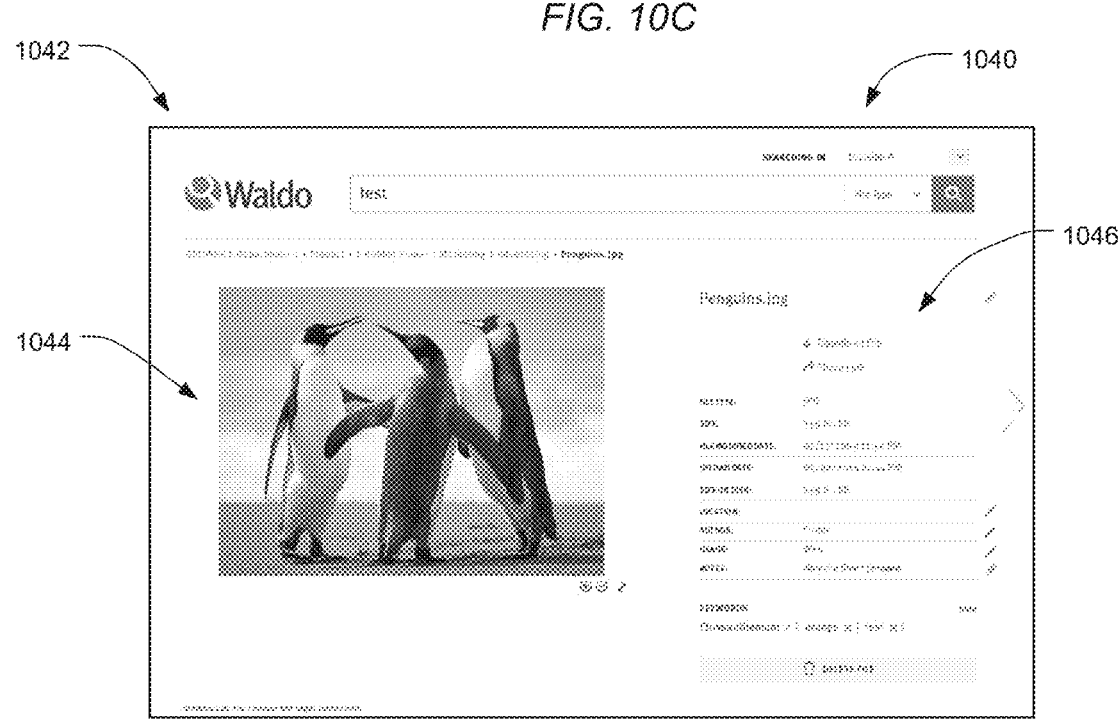

When a user identifies a digital asset of interest, the user can select the preview of the digital asset from search results to 1020 to examine a detailed view of the asset. FIG. 10C illustrates user interface 1040 presenting a detailed view 1042 of a digital asset. The detailed view 1042 can present to the user a preview 1044 of the digital asset and system metadata 1046 associated with the digital asset. In some examples, the type of preview 1044 displayed to the user can correspond with the file type of the digital asset. For example, preview 1044 can be a sound clip where the digital asset is a sound file, or a video clip where the digital asset is a video file. In some examples, in addition to viewing the system metadata of the digital asset, a user can also modify the system metadata so long as the user has the requisite privileges. Similarly, if the user has the requisite privileges, the user can download the asset, share the asset, or delete the asset. In some examples, the digital asset can only be shared to other users of the enterprise. In other examples, the digital assets can be shared by emailing the digital asset. In some examples, sharing the digital asset comprises sending a link to view and/or download the digital asset.

Figure 10D:
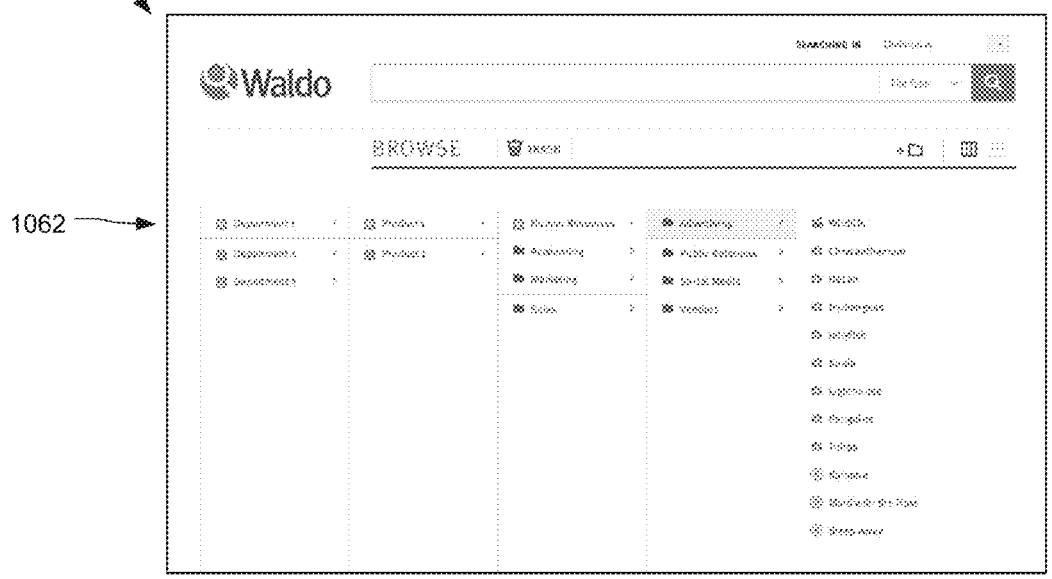

In some examples, a search module can be adapted to allow a user to search for assets by browsing a cost center. FIG. 10D illustrates a user interface 1060 of a search module which facilitates browsing a cost center. User interface can display a hierarchy 1062 of containers and folders representative of an organizational structure of the cost center. Accordingly, hierarchy 1062 is likely to be easily navigable for users familiar with the organizational structure of the cost center (e.g., employees of the business unit associated with the cost center), thereby making it easier for the user to search for digital assets. Once a user locates a digital asset of interest, the user can select the digital asset to cause the search module to present a detailed view of the digital asset similar to the detailed view 1042 of FIG. 10C.

Figure 11:
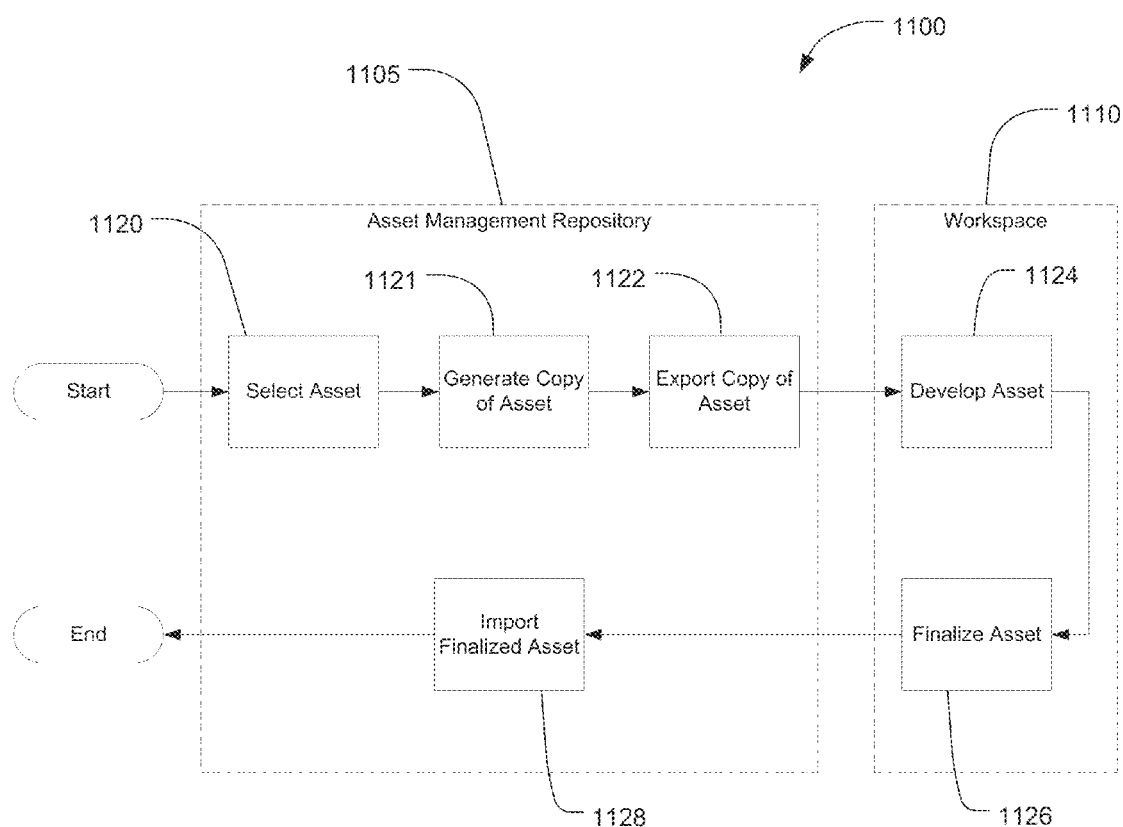
FIG. 11 is a flow diagram illustrating a method that can be executed by a workspace module to facilitate development of digital assets.

In some examples, an asset management system can include a workspace module adapted to facilitate development of assets stored in the system. FIG. 11 illustrates such a method. In some examples, the steps of method 1100 can be performed by a workspace module. Method 1100 includes selecting 1120 an asset to be developed. In some examples, only an authorized user with the requisite privileges can initiate the process exporting and developing an asset. Once the asset is selected, the workspace module can generate 1121 a copy of the asset. In some examples, copying 1121 the asset can also include copying system metadata associated with the asset. Workspace module can then export 1122 the asset from an asset management repository 1105 to a workspace 1110. In some examples, asset management repository 1105 and workspace 1110 can reside on the same server. In some examples, asset management repository 1105 and workspace 1110 can be reside on distinct servers. The latter example can provide the benefit of redundancy and separation of services (e.g., asset management services and development services). After the copy of the asset is exported to the workspace, the asset can then be developed 1124.

In some examples, users of workspace 1110 can collaborate in developing 1124 the asset. In some examples, it is not a prerequisite that a user of workspace 1110 also be a user of the asset management system. For example, workspace 1110 can include its own directory service thereby having a distinct set of users from the asset management system. An authorized user within workspace 1110 can independently invite and manage users to collaborate in developing the asset. Workspace 1110 can be hosted on a server and accessible via a URL. In such examples, an invitation to collaborate can be included as a link in an e-mail or the like. In some examples, workspace 1110 can include a number of features that facilitate the development of the asset. For example, workspace 1110 can include versioning and collaboration features (e.g., live chat, messaging, audio and video conferencing). Once the development of the asset is complete, an authorized user can finalize 1126 the asset and import 1128 the finalized asset back into the asset management repository. In some examples, metadata generated during the course of developing and finalizing the asset can also be imported back into the asset management repository. In some examples, the finalized asset is imported as a new asset distinct from the asset that was exported in step 1122.

Various examples of the invention have been described. Although the present invention has been described in considerable detail with reference to certain disclosed embodiments, the embodiments are presented for purposes of illustration and not limitation. Other embodiments incorporating the invention are possible. One skilled in the art will appreciate that various changes, adaptations, and modifications may be made without departing from the spirit of the invention and the scope of the appended claims

What is claimed is:

1. A system for managing digital assets for a plurality of enterprises comprising:
   one or more databases adapted to store digital assets;
   one or more processors; and
   one or more computer storage mediums storing computer program modules adapted to execute on the one or more processors, the computer program modules comprising:
      an enterprise customization module including an application programming interface (API), the enterprise customization module adapted to:
         generate one or more enterprise profiles, each enterprise profile being associated with an enterprise;
         generate users for each enterprise profile, each user including user-level permissions;
         generate one or more cost centers for each enterprise profile, each cost center being associated with a division of the enterprise, each cost center including containers and folders, each container including container-level permissions;
         receive one or more API uniform resource locators (URLs); and
         generate an API key for each enterprise profile based on an API password and the one or more API URLs, wherein a request to access the system via the API must be authenticated by the API key and must originate from one of the API URLs;
      an upload module for ingesting assets into the system;
      a search module for querying digital assets from the one or more databases; and an access control module adapted to control a user's access to the containers according to the user-level permissions and the container-level permissions of an associated user profile and an associated container, respectively.

2. The system of claim 1, wherein the containers within each cost center are arranged to be representative of an organizational structure of the division of the enterprise associated with the cost center.

3. The system of claim 1, wherein the containers can include containers, folders, and/or digital assets, and wherein the folders can include only folders and/or digital assets.

4. The system of claim 1, wherein the user-level permissions define a set of permissible actions associated with the user and the container-level permissions define a set of permissible actions associated with the container.

5. The system of claim 1, wherein the container-level permissions supersede the user-level permissions such that where the container-level permissions of a container conflict with the user-level permissions of a user profile, access to the container is controlled according to the container-level permissions.

6. The system of claim 1, wherein the container includes an override option which, when selected, causes the access control module to prioritize the container-level permissions over the user-level permissions such that where the container-level permissions of a container conflict with the user-level permissions of a user, access to the container is controlled according to the container-level permissions.

7. The system of claim 1, wherein the user includes an override option which, when selected, causes the access control module to prioritize the user-level permissions over the container-level permissions such that where the container-level permissions of a container conflict with the user-level permissions of a user, access to the container is controlled according to the user-level permissions.

8. The system of claim 1, wherein the upload module is adapted to:
 receive one or more digital assets to upload into an enterprise profile;
 receive descriptive information associated with the one or more digital assets;
 extract asset metadata from each of the one or more digital assets;
 generate system metadata for each of the one or more digital assets based on the descriptive information and/or the asset metadata for each of the one or more digital assets; and
 store the one or more digital assets and the system metadata in the one or more databases and associate the one or more digital assets with a cost structure associated with the enterprise profile.

9. The system of claim 1, wherein the search module is adapted to:
 present a search user interface for searching the one or more databases;
 receive, via the search user interface, a search description;
 generate a search query based on the search description; and
 generate search results based on the search query, the search results comprising one or more digital assets.

10. The system of claim 9, wherein the search module is further adapted to:
 generate search metadata based on system metadata associated with the search results;
 present, via the search user interface, one or more filters according to the search metadata;
 receive, via the search user interface, a selection of one or more filters and
 present filtered search results based on the selection of filters, the filtered search results comprising a subset of the search results.

11. The system of claim 1, wherein the computer program modules further comprise a workspace module, the workspace module adapted to:
 receive a selection of a digital asset;
 export a copy of the digital asset from the one or more databases to a workspace wherein a modified copy of the digital asset can be developed; and
 import the modified copy of the digital asset into the one or more databases.

12. The system of claim 11, wherein the workspace is hosted on a distinct database from the one or more databases.

13. A method for managing digital assets for a plurality of enterprises, the method comprising:
 generating one or more enterprise profiles, each enterprise profile being associated with an enterprise;
 generating users for each enterprise profile, each user including user-level permissions;
 generating one or more cost centers for each enterprise profile, each cost center being associated with a division of the enterprise, each cost center including containers and folders, each container including container-level permissions;
 uploading one or more digital assets into one or more databases, the one or more digital assets being associated with an enterprise profile and organized within an associated cost center;
 querying digital assets from the one or more databases;
 controlling a user's access to the containers according to the user-level permissions and the container-level permissions of an associated user profile and an associated container, respectively; and
 receiving an application programming interface (API) password and one or more API uniform resource locators (URLs); and
 generating an API key for each of the enterprise profiles based on the API password and the one or more API URLs, the API key associated with an API of the one or more enterprise profiles, wherein a request to access the system via the API must be authenticated by the API key and must originate from one of the API URLs.

14. The method of claim 13, further comprising arranging the containers of each cost center to be representative of an organizational structure of the division of the enterprise associated with the cost center.

15. The method of claim 13, wherein the containers can include containers, folders, and/or digital assets, and wherein the folders can include only folders and/or digital assets.

16. The method of claim 13, further comprising defining a set of permissible actions associated with the user and defining a set of permissible actions associated with the container.

17. The method of claim 13, wherein the container-level permissions supersede the user-level permissions such that where the container-level permissions of a container conflict with the user-level permissions of a user profile, access to the container is controlled according to the container-level permissions.

18. The method of claim 13, wherein the container includes an override option which, when selected, causes the container-level permissions to supersede the user-level permissions such that where the container-level permissions of a container conflict with the user-level permissions of a user, access to the container is controlled according to the container-level permissions.

19. The method of claim 13, wherein the user includes an override option which, when selected, causes the user-level permissions to supersede the container-level permissions such that where the container-level permissions of a container conflict with the user-level permissions of a user, access to the container is controlled according to the user-level permissions.

20. The method of claim 13, wherein uploading the one or more digital assets into the one or more databases comprises:
receiving one or more digital assets to upload into an enterprise profile;
receiving descriptive information associated with the one or more digital assets;
extracting asset metadata from each of the one or more digital assets;
generating system metadata for each of the one or more digital assets based on the descriptive information and/or the asset metadata for each of the one or more digital assets; and
storing the one or more digital assets and the system metadata in the one or more databases and associate the one or more digital assets with an enterprise file storage structure associated with the enterprise profile.

21. The method of claim 13, wherein querying assets from the one or more databases comprise:
presenting a search user interface for searching the one or more databases;
receiving, via the search user interface, a search criteria;
generating a search query based on the search criteria; and
generating search results based on the search query, the search results comprising one or more digital assets.

22. The method of claim 21, wherein querying assets from the one or more databases further comprise:
generating search metadata based on system metadata associated with the search results;
presenting, via the search user interface, one or more filters according to the search metadata;
receiving, via the search user interface, a selection of one or more filters; and
presenting filtered search results based on the selection of filters, the filtered search results comprising a subset of the search results.

23. The method of claim 13, further comprising:
receiving a selection of a digital asset;
exporting a copy of the digital asset from the one or more databases to a workspace wherein a modified copy of the digital asset can be developed; and
importing the modified copy of the digital asset into the one or more databases.

24. The method of claim 23, wherein the workspace is hosted on a distinct database from the one or more databases.

25. A method for managing digital assets for a plurality of enterprises, the method embodied in a set of machine-readable instructions executed on a processor and stored on a tangible medium, the method comprising:
generating one or more enterprise profiles, each enterprise profile being associated with an enterprise;
generating users for each enterprise profile, each user including user-level permissions;
generating one or more cost centers for each enterprise profile, each cost center being associated with a division of the enterprise, each cost center including containers and folders, each container including container-level permissions;
uploading one or more digital assets into one or more databases, the one or more digital assets being associated with an enterprise profile and organized within an associated cost center;
querying digital assets from the one or more databases;
controlling a user's access to the containers according to the user-level permissions and the container-level permissions of an associated user profile and an associated container, respectively; and
receiving an application programming interface (API) password and one or more API uniform resource locators (URLs); and
generating an API key for each of the enterprise profiles based on the API password and the one or more API URLs, the API key associated with an API of the one or more enterprise profiles, wherein a request to access the system via the API must be authenticated by the API key and must originate from one of the API URLs.

* * * * *